United States Patent [19]

Pirlet

[11] 4,171,917
[45] Oct. 23, 1979

[54] DETERMINING THE PROFILE OF A SURFACE OF AN OBJECT

[75] Inventor: Robert A. Pirlet, Embourg, Belgium

[73] Assignee: Centre de Recherches Metallurgiques-Centrum voor Research in de Metallurgie, Brussels, Belgium

[21] Appl. No.: 779,562

[22] Filed: Mar. 21, 1977

Related U.S. Application Data

[63] Continuation-in-part of Ser. No. 592,235, Jul. 1, 1975, abandoned.

[30] Foreign Application Priority Data

Jul. 2, 1974 [BE] Belgium .................................. 817191

[51] Int. Cl.² .......................................... G01B 11/24
[52] U.S. Cl. .................................... 356/376; 350/6.8
[58] Field of Search ............... 356/156, 167, 199, 376, 356/381, 429, 431; 350/6.8, 6.91; 250/559, 563, 571

[56] References Cited

U.S. PATENT DOCUMENTS 3,016,464 1/1962 Bailey .................................. 356/167
3,667,846 6/1972 Nater .................................. 356/156
3,835,249 9/1974 Dattilo et al. ...................... 350/6.8
3,976,382 8/1976 Westby .............................. 356/167

FOREIGN PATENT DOCUMENTS 2306187 8/1974 Fed. Rep. of Germany ........... 356/156
1191867 5/1970 United Kingdom ..................... 356/167

Primary Examiner—John K. Corbin
Assistant Examiner—R. A. Rosenberger
Attorney, Agent, or Firm—Holman & Stern

[57] ABSTRACT

The profile of a surface of an object is determined by scanning the line of intersection of this surface and a given plane transverse to the object. A radiation transmitter provides a transmitting beam, and a radiation receiver provides a receiving beam. Deflection means causes scanning movement of one or both of the beams so that a zone of intersection of the beams scans along a predetermined line and a detector in the receiver receives radiation transmitted from a source in the transmitter and reflected by the surface of the object. The deviation of the actual line of intersection from the predetermined line is determined from data supplied by the detector at a plurality of positions along the line of intersection.

23 Claims, 11 Drawing Figures

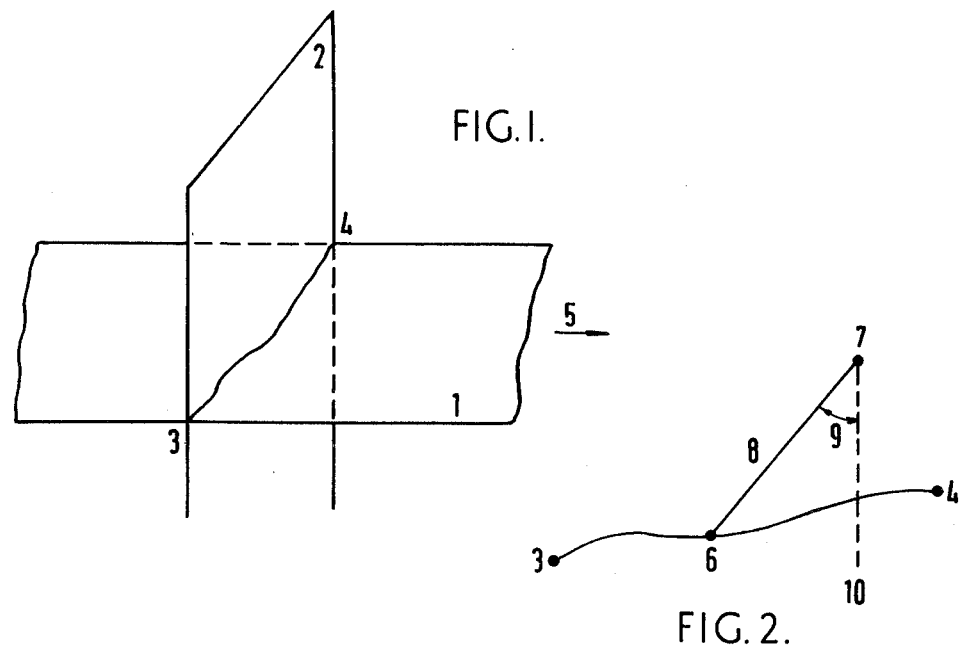
FIG. 1.
FIG. 2.
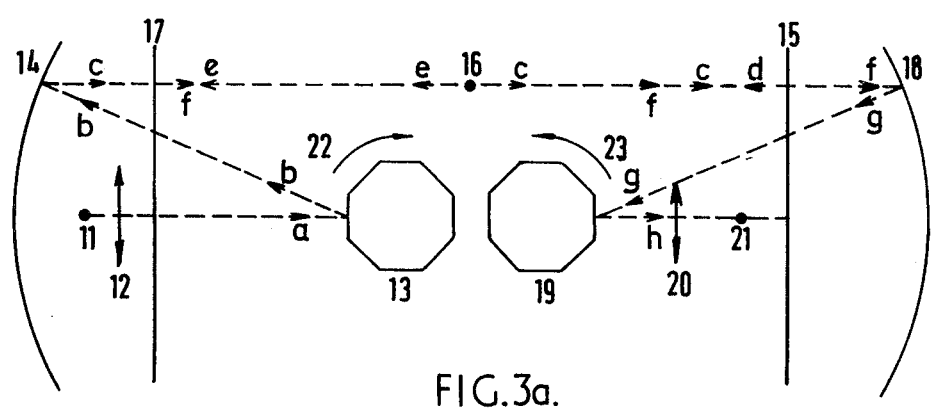
FIG. 3a.
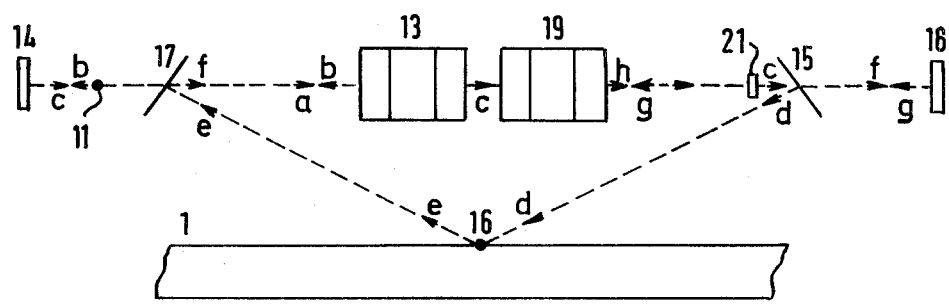
FIG. 3b.

DETERMINING THE PROFILE OF A SURFACE OF AN OBJECT

This application is a continuation-in-part of application Ser. No. 592,235, "Determining the Shape and Dimensions of the Cross-section of an object", filed July 1st, 1975, by Robert Alfred Pirlet, now abandoned.

The present invention relates to a method and apparatus for determining the profile of a surface of an object, for example a rolled strip or a beam undergoing rolling.

BACKGROUND OF THE INVENTION

The determination of the profile of a product undergoing rolling is of great importance since it renders it possible to verify not only the quality of the product rolled but equally the quality of the rolling operation.

As a rule, a determination of this nature is not performed until the product is at rest and has cooled sufficiently. It provides data on faulty products which must either by scrapped or recycled, as well as data regarding the adjustments to be performed in respect of the rolling operation. The wasted or recycled products represent costs which are a heavy charge on the rolling operation and establish the interest of a continuous measurement during the rolling operation.

On the other hand, the rolling mill operators continue their research work for the purpose of controlling sheet or strip rolling mills and in particular wide-strip rolling trains, in such a manner as to product metal sheets offering better flatness properties. It is with this intention that the method described below has been developed, which renders it possible to verify the rolling efficiency and subsequently to place at the disposal of the rolling mill operators a measurement which may be used as an input value for automatic control purposes.

SUMMARY OF THE INVENTION

The present invention provides a method of determining the profile of a surface of an object by scanning the line of intersection of the said surface and a given plane transverse to the object, comprising: providing a transmitting beam by means of a radiation transmitter including a stationary source of radiation; providing a receiving beam by means of a radiation receiver including a stationary detector of radiation; causing scanning movement of at least one of the said beams by deflection means, so that a zone of intersection of the transmitting beam and the receiving beam scans along a predetermined line (preferably an ideal line corresponding to the said line of intersection) and the detector receives radiation transmitted from the source and reflected by the said surface; and determining from data supplied by the detector, at a plurality of positions along the said line of intersection, the deviation of the said line of intersection from the said predetermined line.

The source is preferably a laser.

Preferably, one of the two co-ordinates of each point of the said line of intersection in the said given plane is determined from the data supplied by the detector, while the other co-ordinate is determined from the state of the deflecting means.

The data supplied by the detector may have the form of an intermittent or, preferably, continuous signal.

The present invention also provides apparatus for determining the profile of a surface of an object by scanning the line of intersection of the said surface and a given plane transverse to the object, comprising: a radiation transmitter providing a transmitting beam, the transmitter including a stationary source of radiation; a receiver providing a receiving beam, the receiver including a stationary detector of radiation; deflection means for causing scanning movement of at least one of the beams so that a zone of intersection of the transmitting beam and the receiving beam scans along a predetermined line (e.g. an ideal line corresponding to the said line of intersection) and the detector receives radiation transmitted from the source and reflected by the said surface; and means for determining the deviation of the said line of intersection from the said predetermined line from data supplied by the detector at a plurality of positions along the said line of intersection.

The apparatus may also comprise means for visually displaying or for exploiting the co-ordinates of the points of the said line of intersection in the said given plane, for example a display board, a cathode-ray tube, or a computer programmed to extract values characteristic of the shape and the dimensions of the profile.

The deflection means preferably comprises a rotating polygonal mirror or an oscillating plane mirror. Alternatively, the deflection means may be optic-acoustic component driven by a low-frequency signal.

The means for determining the deviation of the line of intersection is preferably operatively connected to the deflection means as well as the detector. In this case, the detector may be formed by a series of photodiodes whose indication has the form of an intermittent signal, or by a Schottky barrier-type PIN photo-diode (monodimensional photopotentiometer) whose indication has the form of a continuous signal. In the case in which several photo-diodes of the detector are energised, the "median" photodiode provides the signal to be considered.

By contrast, if the detector is intended to supply data from which both co-ordinates of the points on the line of intersection can be determined, this detector preferably comprises a two-dimensional sensitive surface, and for example, is formed by a two-dimensional photopotentiometer.

BRIEF DESCRIPTION OF THE DRAWINGS

FIG. 1 illustrates the surface of a product undergoing rolling, and an imaginary measuring plane which is generally vertical and at right angles to the axis of translation of the product;

FIG. 2 illustrates the case of point by point scanning of the profile of a rolled product, by means of a movable beam of optical radiation;

FIGS. 3a and 3b, in plan view and side elevation respectively, diagrammatically illustrate a form of embodiment of apparatus for determining the profile of the upper surface of a rolled product;

DESCRIPTION OF PREFERRED EMBODIMENTS

Figure 4A:
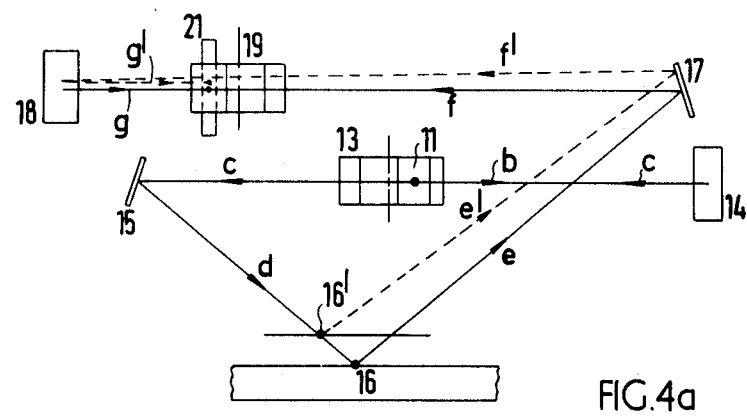
FIGS. 4a to c diagrammatically illustrate a modified form of apparatus in side view, plan view, and end view, respectively.

According to FIG. 1, the rolled product undergoing rolling is displaced in the direction of the axis corresponding to the arrow. A transverse measuring plane 2 (imaginary) has been selected whose intersection with the upper surface 1 of the product defines the profile 3–4 which is to be determined and whose dimensions are to be calculated. As a rule, the upper surface 1 of the product is situated in a subsequently horizontal plane and the measuring plane 2 is substantially vertical.

According to FIG. 2, the profile 3-4 to be measured is scanned by means of a laser beam travelling from a point 7, along an axis 6-7, and encountering the rolled product at a point 6. The co-ordinates of the point 6 are the length 8 of the axis 6-7 and the angle 9 subtended by the axis 6-7 with a reference axis 7-10.

According to FIGS. 3a and 3b, optical radiation emitted by a laser 11 is focussed by a lens 12 into a beam a which encounters a rotating octagonal mirror 13 and is reflected as a beam b. The beam b is directed by the rotating mirror 13 towards a concave reflector 14, which reflects a beam c towards a plan semi-reflecting mirror 15 which reflects a beam d towards the surface 1, which it strikes at a point 16 forming part of the profile which is to be determined. The components 11 to 15 constitute a transmitter providing a transmitting beam d.

From the point 16, a fraction of the laser radiation is reflected as a beam e towards a plane semi-reflecting mirrow 17, which reflects a beam f towards a concave reflector 18, which reflects a beam g towards a rotating octagonal mirror 19. The beam h reflected from the mirror 19 travels through a focussing lens 20, to reach a detector 21, finally. The components 17 to 21 constitute a receiver for reflected radiation.

The point 16 of incidence, which moves along the profile which is to be determined, is constantly kept within the receiving beam provided by the receiver, i.e. within the field of observation of the detector 21, owing to the synchronisation of the rotating mirrors 13 and 19. In the present case, this synchronisation is assured by causing the mirrors 13 and 19 to turn at the same speed but in opposite directions, as shown by the arrows 22 and 23.

One of the two co-ordinates of each of the points defining the profile which is to be determined, is provided by the detector 21, which comprises a vertical series of photodiodes. The photodiodes which has been reached by the reflected radiation occupies a known position, which characterises the level of the point in question of the said profile. The other co-ordinate is provided by the angular position of one of the mirrors 13, 19. The detector 21 and the mirrors are operatively connected to means for determining the coordinates.

It is to be noted that only part of the beam c incident on the semi-reflecting mirror 15 results in the reflected beam d. The remainder passes through the mirror 15 and follows a path via the mirrors 18 and 19 to the detector 21, in which it will always illuminate one photodiode because the said path always lies in the same horizontal plane. This illumination is a useful piece of information, since its displacement would indicate an irregularity in the apparatus.

Figure 4B:
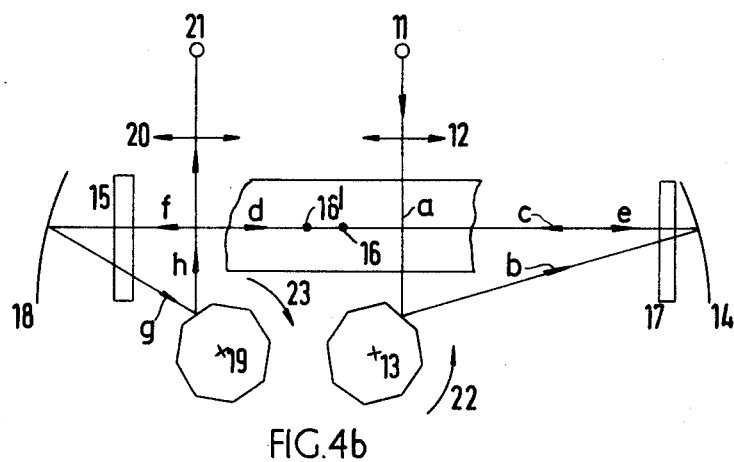
Figure 4C:
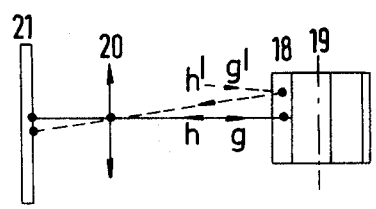
Figure 5:
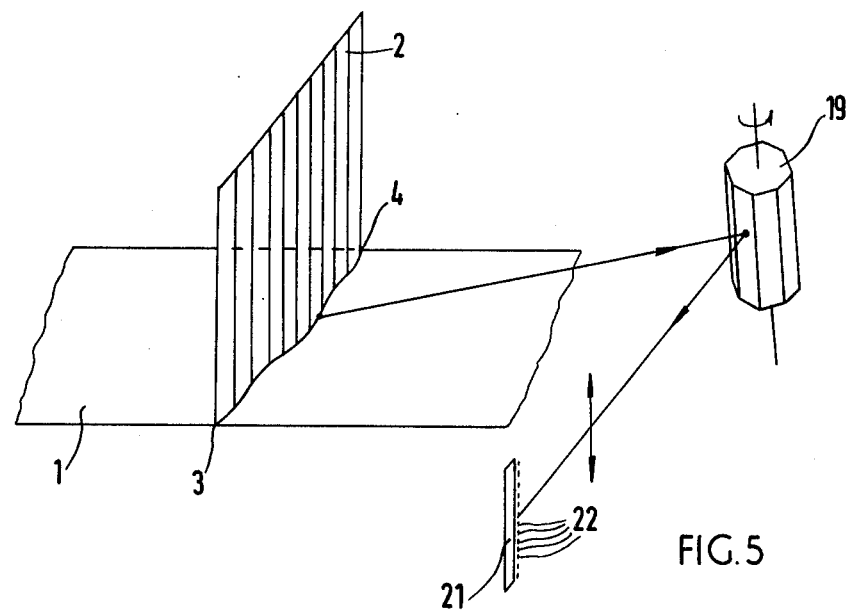
FIGS. 5 to 8 diagrammatically illustrate four alternative methods of scanning the profile of a product.
Figure 6:
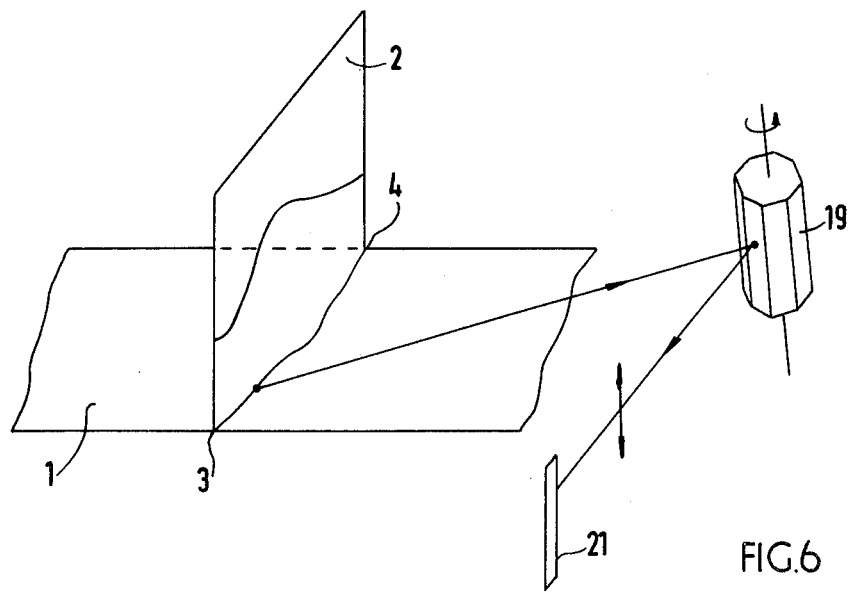
Figure 7:
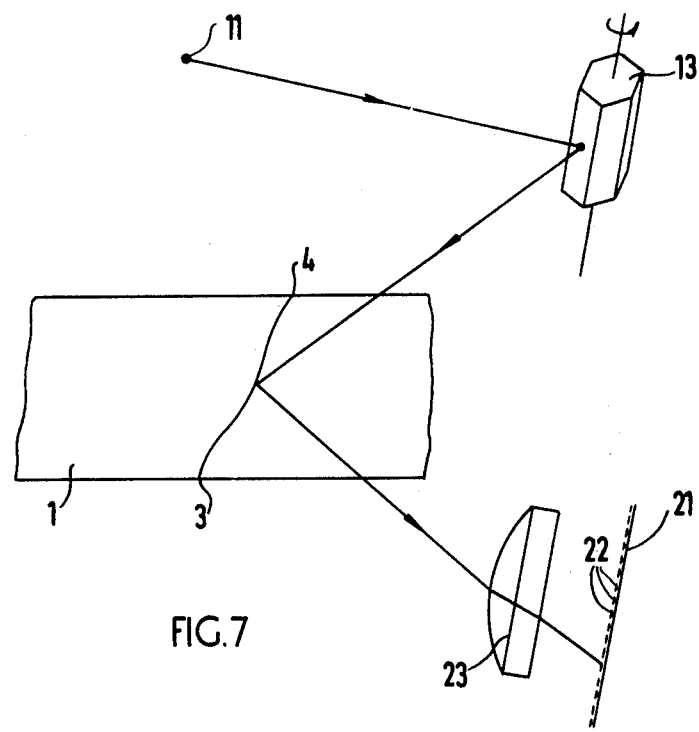
Figure 8:
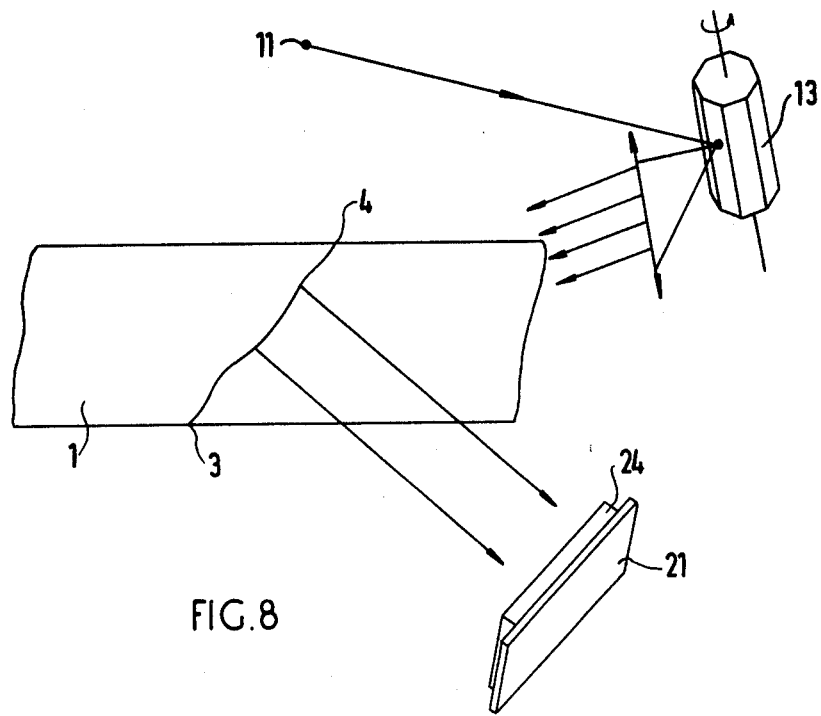

The apparatus illustrated in FIGS. 4a to c is similar to that illustrated in FIGS. 3a and b except that the transmission system and the reception system are offset from each other in the vertical direction so that they do not obstruct each other. Because of this, the mirrors 15 and 17 can be totally reflecting. FIGS. 4a to c also illustrate what happens if the profile being determined differs from the ideal profile (in this case a straight line at a given level): the transmitted beam d will now be incident at a point 16' and will result in a reflected beam e'. Thus, the reflected radiation will follow a path e'-f'-g'-h' deviating from the path e-f-g-h but still received by the detector 21. (Note that the path e'-f'-g'-h' is, in projection in the place of FIG. 4b, coincident with the path e-f-g-h.) The photodiode reached by the radiation characterises the level of the point 16'.

Other examples are given below to show different and preferred combinations of several devices in accordance with the present invention.

EXAMPLE 1 (FIG. 5).

From a stationary light source a planar beam of light is transmitted to illuminate the entire line of intersection 3-4 of the imaginary measuring plane with the surface 1 of the product undergoing rolling. This intersection is scanned by means of an octagonal mirror 19 rotating about its axis, which has the function of bringing all the points of the intersection into the field of view of a detector 21. The detector comprises a series of 500 photodiodes 22 having a switching frequency of 1 MHz from one diode to the next, which allows of a 2000 sweeps per second of the totality of the series of diodes. If the mirror 19 turns in such a manner as to produce 100 scanning operations per second along the intersection 3-4, it follows that, in the course of one scanning operation, the detector 21 will undergo 20 sweeps and will consequently provide one co-ordinate of each of the 20 points of the said intersection thus determined. The second co-ordinate of each of these points is provided by the angular position of the rotating mirror 19.

EXAMPLE 2 (FIG. 6).

From a stationary light source a planar light beam spatially modulated in amplitude is transmitted to illuminate the entire line of intersection 3-4 of the imaginary measuring plane with the surface 1 of the product undergoing rolling. This intersection is observed by means of a rotating mirror 19, as in Example 1. The detector 21 comprises a Schottky barrier-type PIN diode providing data in the form of an uninterrupted signal. One coordinate of each point on the intersection 3-4 is provided by the said signal; the other coordinate is provided by the angular position of the rotating mirror 19.

EXAMPLE 3 (FIG. 7).

Light from a directional source 11 is reflected by a rotating hexagonal mirror 13 as a beam which scans the entire line of intersection 3-4 of the imaginary measuring plane and the surface 1 of the rolled product. The detector 21 comprises a series of photodiodes 22 and situated before this detector is a cylindrical objective lens 23 enabling the reflected beam to reach the detector 21 whatever the position of the transmitter beam.

The detector 21 operates as in Example 1, the second coordinate of each point being provided by the angular position of the mirror 13.

EXAMPLE 4 (FIG. 8).

Light from a directional source 11 is transmitted as a beam which is displaced parallel to itself by suitable means as described with reference to FIGS. 3a and b including a rotating mirror 13 and consecutively illuminates all the points of the line of intersection 3-4 which is to be determined. The detector 21 is a sensitive element of the two-dimensional detection type, for example a Schottky barrier-type PIN diode, having a sensitive surface 24 allowing the two co-ordinates of an image impinging on it to be determined.

I claim:

1. A method of determining the profile of a surface of an object by scanning the line of intersection of the said surface and a given plane transverse to the object, comprising: providing a transmitting beam by means of a radiation transmitter including a stationary source of radiation; receiving a beam by means of a radiation receiver including a stationary detector of radiation; causing simultaneous scanning movement of both of the said beams by deflection means, so that a zone of intersection of the transmitting beam and the received beam scans along a predetermined line and the detector receives radiation transmitted from the source and reflected by the said surface; and determining from the data supplied by the detector, at a plurality of positions along the said line of intersection the deviation of the said line of intersection from the said predetermined line, wherein simultaneous synchronous scanning movement of both beams, such that the zone of intersection scans along the said predetermined line, is caused by the deflection means.

2. A method as claimed in claim 1, in which the source is a laser.

3. A method as claimed in claim 1, in which one of the two co-ordinates of each point of the said line of intersection in the said given plane is determined from data provided by the detector, the other co-ordinate being determined from the state of the deflection means.

4. A method as claimed in claim 3, in which the data supplied by the detector is in the form of a continuous signal.

5. A method as claimed in claim 1, in which the transmitter and the receiver include reflectors.

6. A method as claimed in claim 1, in which the deflection means comprises at least one rotating optical component.

7. A method as claimed in claim 6, in which the said optical component is a reflector.

8. A method as claimed in claim 1, in which the deflection means comprises two rotating optical components deflecting the respective beams.

9. A method as claimed in claim 8, in which the components have parallel rotation axes and rotate at the same speed in opposite directions.

10. A method as claimed in claim 1, in which the deflection means comprises a single rotating optical component having two reflecting faces deflecting the respective beams.

11. A method as claimed in claim 10, in which the two faces are opposite to each other.

12. A method as claimed in claim 1, in which at least one of the beams scans parallel to itself.

13. Apparatus for determining the profile of a surface of an object by scanning the line of intersection of the said surface and a given plane transverse to the object, comprising: a radiation transmitter providing a transmitting beam, the transmitter including a stationary source of radiation; a receiver receiving a beam, the receiver including a stationary detector of radiation; deflection means for causing a simultaneous scanning movement of both of the beams so that a zone of intersection of the transmitting beam and the received beam scans along a predetermined line and the detector receives radiation transmitted from the source and reflected by the said surface; and means for determining the deviation of the said line of intersection from the said predetermined line from data supplied by the detector at a plurality of positions along the said line of intersection, wherein the deflection means causes simultaneous synchronous scanning movement of both beams, whereby the zone of intersection is scanned along the said predetermined line.

14. Apparatus as claimed in claim 13, in which the source is a laser.

15. Apparatus as claimed in claim 13, in which the means for determining the deviation is operatively connected to the deflection means, whereby one of the two co-ordinates of each point of the said line of intersection in the said given plane is determined from data provided by the detector and the other co-ordinate is determined from the state of the deflection means.

16. Apparatus as claimed in claim 15, in which the detector supplies data in the form of a continuous signal.

17. Apparatus as claimed in claim 13 in which the transmitter and the receiver include reflectors.

18. Apparatus as claimed in claim 13, in which the deflection means comprises at least one rotatable optical component.

19. Apparatus as claimed in claim 18, in which the optical component is a reflector.

20. Apparatus as claimed in claim 13, in which the deflection means comprises two rotatable optical components for deflecting the respective beams.

21. Apparatus as claimed in claim 20, in which the components have parallel rotation axes and are arranged to rotate at the same speed in opposite directions.

22. Apparatus as claimed in claim 13, in which the deflection means comprises a single rotatable optical component having two reflecting faces for deflecting the respective beams.

23. Apparatus as claimed in claim 22, in which the two faces are opposite to each other.

* * * * *